(12) United States Patent
Pavlioglou

(10) Patent No.: US 11,395,104 B2
(45) Date of Patent: Jul. 19, 2022

(54) ELECTRONIC MONITORING AND REPORTING SYSTEM FOR DISCHARGING JUDICIAL OBLIGATIONS

(71) Applicant: CheckUps Corp., San Antonio, TX (US)

(72) Inventor: Enrique Pavlioglou, San Antonio, TX (US)

(*) Notice: Subject to any disclaimer, the term of this patent is extended or adjusted under 35 U.S.C. 154(b) by 7 days.

(21) Appl. No.: 17/061,557

(22) Filed: Oct. 1, 2020

(65) Prior Publication Data

US 2021/0099840 A1 Apr. 1, 2021

Related U.S. Application Data

(60) Provisional application No. 62/908,606, filed on Oct. 1, 2019.

(51) Int. Cl.
| | |
|---|---|
| *H04W 4/029* | (2018.01) |
| *H04W 4/02* | (2018.01) |
| *G06Q 50/26* | (2012.01) |
| *H04W 4/021* | (2018.01) |
| *H04W 4/48* | (2018.01) |

(52) U.S. Cl.
CPC ............ *H04W 4/029* (2018.02); *G06Q 50/26* (2013.01); *H04W 4/021* (2013.01); *H04W 4/023* (2013.01); *H04W 4/48* (2018.02)

(58) Field of Classification Search
None
See application file for complete search history.

(56) References Cited

U.S. PATENT DOCUMENTS

| | | | | |
|---|---|---|---|---|
| 7,123,141 B2 * | 10/2006 | Contestabile | ...... | G08B 21/0269 340/539.13 |
| 10,891,844 B1 * | 1/2021 | Trunzo | ............... | G08B 21/0202 |
| 2010/0238024 A1 * | 9/2010 | Derrick | ................. | G08B 21/22 340/539.13 |
| 2016/0232772 A1 * | 8/2016 | Shechter | ............ | G08B 21/0236 |
| 2017/0084149 A1 * | 3/2017 | Spikes | ............... | G08B 21/0288 |
| 2019/0340906 A1 * | 11/2019 | Williams | ........... | G08B 21/0269 |

* cited by examiner

*Primary Examiner* — Adolf Dsouza
(74) *Attorney, Agent, or Firm* — Shah IP Law, PLLC

(57) ABSTRACT

The invention disclosed herein enables electronic communications with pretrial defendants, probationers, and parolees about their court mandated obligations. Specifically, the present invention makes it easy for probationers to comply with court mandated requirements and makes it easy for supervision officers to administer the parole process as well as other court mandated requirements. For example, the invention enables a parolee to electronically receive reminders about court mandated deadlines. It permits parole officers to obtain a location associated with a parolee and helps ensure that the location is not spoofed.

20 Claims, 12 Drawing Sheets

| Timeline: | 2020-09-26 | 🗓 |

12:45 81.00% 2 Alerts

13:00 94.00% 2 Alerts

13:15 94.00% 2 Alerts

13:30 94.00% 2 Alerts

13:45 94.00% 2 Alerts

14:00 94.00% 2 Alerts

14:15 94.00% 2 Alerts

14:30 94.00% 2 Alerts

14:45 94.00% 2 Alerts

15:00 94.00% 2 Alerts

ELECTRONIC MONITORING AND REPORTING SYSTEM FOR DISCHARGING JUDICIAL OBLIGATIONS

BACKGROUND

Field of the Art

This disclosure relates to systems and methods for electronically communicating with pretrial defendants, probationers and parolees about their court mandated obligations.

Discussion of the State of the Art

Pretrial defendants who are released from jail pending their hearings are required to maintain contact with the court by presenting themselves at scheduled intervals for drug testing, payments and/or court dates. Currently, these individuals are given a written notice from the court, which specifies the various monitoring and reporting obligations that are placed on the individual.

The various reporting obligations often place a significant burden on the individual or the defendant who is tasked with these obligations and often interfere with the defendant's or the individual's other work and/or family obligations. And, as a result, defendants sometimes fail to discharge their reporting obligations by failing to report for various judicial hearings and other activities. The consequences of these failed appearances can range from minor infractions that may be penalized by the court to imprisonment or the revocation of a parole grant. Often, these failures subvert the intent of the parole program entirely, which is to rehabilitate offenders and guide them back into society while minimizing the likelihood that they will commit a new offense. Instead, the minor infractions caused by a failure to report often cause the parolees to be imprisoned on a technicality, which, at least according to some studies, tends to increase the rates of recidivism.

The various court-mandated reporting obligations also represent a significant cost for the agencies and governments that must administer these privileges. For example, probationers and parolees (herein pretrial defendants, probationers and paroles will be referred to collectively as probationers) typically report to community supervision officers or parole officers (herein referred to as supervision officers) to ensure that they are compliant with the terms of their supervised release. Supervision officers, therefore, often have to track and manage a multitude of different reporting dates and obligations for, often, hundreds of probationers. Moreover, the reporting dates and obligations are often constantly changing as the parolees' obligations are varied from one or more court hearings. As such, managing and administering the parolees is often a complicated administrative task for supervision officers. Moreover, if the parolees do not appear at the required time or location, the supervision officer may have to physically track the offending parolee, which often requires the expenditure of significant time, cost, and resources.

The current system for tracking the reporting court-mandated obligations is burdensome for the parolees, a complex and costly endeavor for the governments and agencies that administer these obligations, and sometimes subvert the goals of a parole program entirely.

SUMMARY

The present invention overcomes many of limitations described above by making it easy for probationers to comply with court mandated requirements and making it easy for supervision officers to administer the parole process and other court mandated requirements. In one embodiment of the invention, the system and method described herein permits a parolee to receive reminders about his or her court mandated requirements. Moreover, the present invention provides a system and a method for obtaining the specific location of a parolee's mobile computing device. This enables parole officers to obtain the parolee's location thereby enabling the supervision officer to quickly find the parolee and/or ensure that the parolee has not violated the terms of his or her parole by visiting areas that are prohibited by a court. The present disclosure also provides a system and a method for ensuring that the parolee's mobile computing device does not spoof its location, and to ensure that the mobile computing device that is tracked is in fact associated with the parolee.

In one embodiment, the present invention is for a computer program product comprising a non-transitory computer readable storage medium having instructions encoded thereon that, when executed by a processor, causes the processor to receive and store data, and send out notices. More specifically, the present invention is for a computer program product that provides a method for supervision officers to input probationers' court mandated requirements onto a remote server. Probationers then send their individual device information to a remote serve. Thereafter, probationers get notifications sent from the remote server to their devices reminding them of their court mandated dates.

In one embodiment of the invention, the notification system is effectuated through an app on the probationer's phone. One benefit of the present invention is that by receiving notifications on their phones, probationers are being reminded of their court dates in a modern way and will be more likely to appear as required. Using this method, eliminates the negative consequences of misplacing paperwork.

In one embodiment of the invention, the remote server sends a communication to the supervision officer when a notice is sent to the probationer. One benefit of this is that the supervision officer has a record of the notifications that are sent and can utilize that data when managing their cases.

In one embodiment of the invention, the supervision officer can manually input all court dates, check-in dates, and drug testing dates into a database. The database relates the data to each probationer and their individual device. One benefit of this is that the data is all in one place and is easy to track for the supervision officer. It can also be updated easily, and notices can be sent quickly from the remote server to each probationer as necessary. Providing fast, accurate information to each probationer provides a higher level of support than is currently seen in the industry.

In one embodiment of the invention, after downloading the app, the probationer takes a picture of himself and sends the picture as well as the other device information to the remote server. Having a picture of the probationer in the database adds another level of verification for the supervision officer.

In one embodiment of the invention, the location of the probationer's device is stored and monitored on the remote server. The benefit of this is that the supervision officer can know where the probationer's device is at any given time.

In one embodiment, the end user device of the probationer can be monitored at predetermined periods of time at predetermined frequencies. During these predetermined periods of time, the end user device can be queried for location information. The benefit of this is that the drain on the end user device is minimized. The drain on the end user device can be from a drainage of the battery therein or an exhaustion of a data plan for the end user device. Furthermore, in various embodiments of the present invention it is contemplated that most of the monitoring and administrative features can be performed at the server side, or by the administrator's web suite, so as to reduce computing burdens on the end user device, thereby ensuring that the end user can cheaply and easily use most smart phones and other devices without requiring higher end products and data plans. In addition, by limiting pinging of the end user device to certain periods of time, and by not constantly pinging the end user device, greater efficiency can be achieved.

Although the description herein discusses applying the present invention to parolees and court mandated appearances, the invention itself may be applied to a variety of different use cases including check-ins that may be required for employment purposes, tracking purposes, biometrics and verification purposes, etc., without departing from the scope of the invention. For example, the present invention may be used to permit employees or contractors to check-in when they are at a construction site. In other use cases, the present invention may be used to permit delivery personnel check-into a delivery location and to confirm appropriate delivery of items. In some embodiments, the present invention may be used to augment or replace a biometric tracking system as would be readily understood by persons of ordinary skill in the art.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

FIG. 9 illustrates an exemplary timeline detailing activities or alerts from a parolee end user device according to an exemplary embodiment of the present invention.

DETAILED DESCRIPTION

Figure 1:
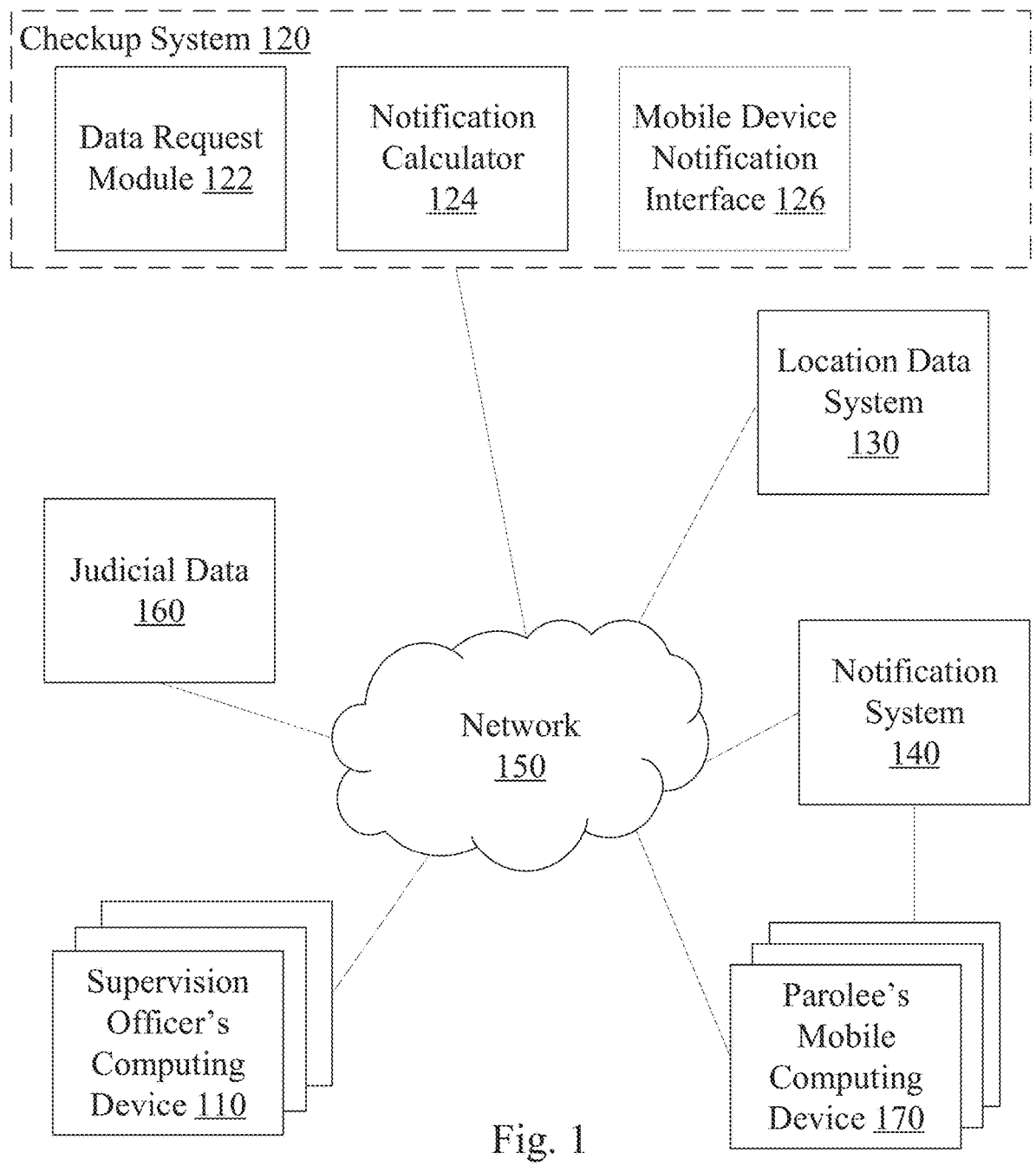
FIG. 1 illustrates a system for monitoring parolees in accordance with an exemplary embodiment of the invention.

The inventive system and method (hereinafter sometimes referred to more simply as "system" or "method") described herein significantly reduces the computing resources, computing time, and costs associated with making predictions in a deployed machine learning system, regardless of whether the predictions are made using a deployed system or a cloud scoring API. Specifically, the inventive system stores certain predictions once they are made, processes the stored data, and uses stored predictions if newly requested predictions meet certain similarity criteria associated with the stored predictions. The inventive system described herein reduces the computing resources, computing time, and costs cost associated with making predictions in a dedicated, or shared/rented machine learning system environment.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

Conceptual Architecture

FIG. 1 illustrates an embodiment of the conceptual architecture for the monitoring system (i.e., checkup system) 120, which, according to an embodiment, may be comprised of a data request module 122, a notification calculator 124 and a mobile device notification interface 126. The monitoring system 120 is described in greater detail in FIG. 2, but in general the monitoring system 120 utilizes the judicial data 160 and data provided by a supervision officer to establish individual user profiles and notification intervals to keep parolees informed and confirm their check-in if required. The monitoring system 120 further communicates with the notification system 140 to send notifications to end user devices, such as parolees' mobile computing devices 170.

In addition to the monitoring system 120, the inventive system includes judicial data 160 which may be provided by the judicial system or supervision officer about individual parolees. The judicial data, for example, may be comprised of information about the parolee and the terms of parole. It may, for example, comprise information about court appearances the parolee must make, the check-ins the parolee must perform and the specific terms of those appearances and/or the specific terms of those requirements, etc. In one embodiment, the monitoring system 120 receives the judicial data and calculates check-in and appearance requirements for the parolee.

An administrator's web suites, servers, and computing devices, or supervision officer's computing device 110, enables a supervision officer to input additional information about the parolee and/or the terms of parole. In one embodiment, the supervision officer's computing device receives additional information such as the dates of the court appearances, dates/times of check-ins, permitted geographic locations and/or permissible radius of travel, etc. In one embodiment, the monitoring system 120 receives the data entered by the supervision officer and calculates check-in and appearance requirements for the parolee.

The parolee's mobile computing device 170 receives notifications that may be calculated by the monitoring system 120. In one embodiment, the parolee's mobile computing device 170 may display notifications to the parolee and the date/time and/or frequency that may be set by the monitoring system 120 and/or the notification system 140. In one embodiment, the parolee's mobile computing device 170 may prompt a user to submit his or her current location, which may be obtained from a location data system 130 and/or the mobile device's 170 operating system level software layer. In addition, the parolee's mobile computing device 170 may prompt the parolee to submit a photograph, which may be taken contemporaneously and submitted to the monitoring system 120 with metadata, such as, but not limited to location data, date and/or time data, device data, etc.

The notification system 140 interfaces with the monitoring system 120 to push notifications to the parolee's mobile computing device 170. In one embodiment of the invention, the notification system 140 interface with various computing devices and may identify devices by the unique identification number. In one embodiment, the notification system 140 functions as a clearing house for delivering communication generated by the monitoring system 120 and sending them to the parolee's device 170.

The location data system 130 provides location data associated with, an end user device, such as a parolee's mobile computing device 170. A variety of different location data services may be used, as would be apparent to a person of ordinary skill in the art, without departing from the scope of the invention, including, but not limited to GPS, GLONASS, cell phone tower triangulation, etc. In addition, the identity of the end user device can be verified by methods include checking the cell phone number for the end user device, a MAC address for the end user device, an IMEI number, or a vendor ID for the parolee's device 170. Additionally, the location data system can receive mapping data from third party vendors such as Google Maps.

Supervision officer's computing device 110 and parolee's mobile computing device 170 may be more generally referred to as client device(s) 110 or user device(s) 110. They may include, generally, a computer or computing device including functionality for communicating (e.g., remotely) over a network 150. Data may be collected from client devices 110, and data requests may be initiated from each client device 110. Client device(s) 110 may be a server, a desktop computer, a laptop computer, personal digital assistant (PDA), an in- or out-of-car navigation system, a smart phone or other cellular or mobile phone, or mobile gaming device, among other suitable computing devices. Client devices 110 may execute one or more client applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access network 110. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110 one or more Hyper Text Markup Language (HTML) files responsive to the HTTP request. The user device 110 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application 110 obtains data from the network 110 and displays it to the user within the application 533 interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to clients devices or other devices in response to HTTP or other requests from clients devices or other devices. A mail server is generally capable of providing electronic mail services to various clients devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 2:
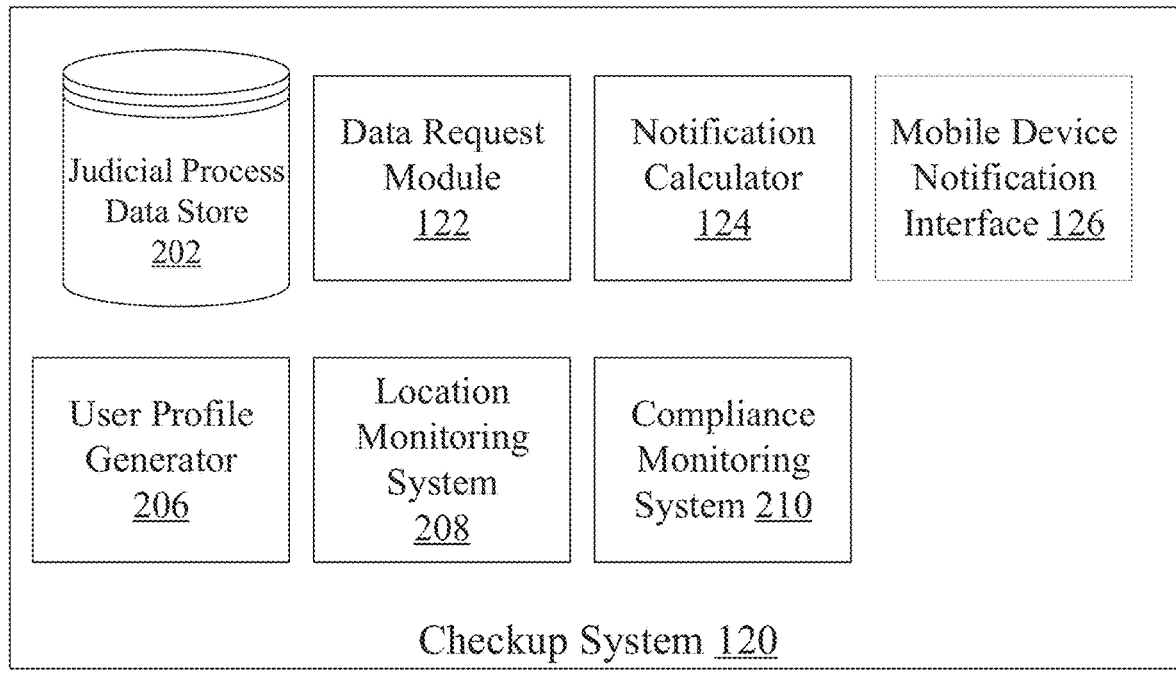
FIG. 2 illustrates the various modules and sub-modules of the monitoring system in accordance with an embodiment of the invention.

FIG. 2 illustrates the various modules and sub-modules of monitoring system 120 (i.e., checkup system) in accordance with an embodiment of the invention. The monitoring system 120 includes a judicial process data store 202, a data request module 122, a notification calendar 124, a mobile device notification interface 126, a user profile generator 206, a location monitoring system 208 and a compliance monitoring system 210. Other systems and databases may be used, as would be readily understood by a person of ordinary skill in the art, without departing from the scope of the invention.

The monitoring system 120 receives the judicial data 160 and retains it in the judicial process data store 202. The judicial data 160 is necessary to relate to each parolee to effectuate the monitoring system.

The monitoring system 120 includes a data request module 122 which request data and information from the supervision officer. The monitoring system 120 also includes a user profile generator 206, which generates user profiles to send through the notification system 140 to parolees' mobile computing devices 170. The user profile is correlated with the individual parolee information provided by the supervision officer and is accessible to the supervision officer via the supervision officer's computing device 110.

The monitoring system 120 includes a mobile device notification interface 126 which allows the parolee's mobile computing device 170 and the monitoring system 120 to communicate. The mobile device notification interface 126 can include access to a push notification system to provide push notifications to the parolee's mobile computing device 170 when required by the administrator or system. The mobile device notification interface 126 can allow the parolee's mobile computing device 170 to perform functions by providing the end user with the ability to perform check-in events, agenda events, location monitoring, and curfew events. The timing of the communications between the parolee's mobile computing device 170 and the monitoring system 120 is determined by the notification calculator 124 and effectuated through the notification system 140. The notification calculator 124, utilizes the judicial data 160 and other data provided by the supervision officer to calculate when to send notification to the parolee's mobile computing device 170.

In addition to generating notifications for parolees about individual court mandated appointments and required check-ins, the monitoring system 120 includes a location monitoring system 208 and a compliance monitoring system 210. The location monitoring system 208 may monitor the parolee's mobile computing device's 170 location in a specified area or may monitor if a parolee's mobile computing device 170 is outside a specified area. The monitoring system 120 may then send a notification to the supervision officer's computing device 110 if there are deviations from set parameters. The compliance monitoring system 210 monitors the parolee's compliance and alerts the supervision officer's computing device 110 if the parolee is not in compliance. A variety of different monitoring methodologies may be used, as would be readily understood to a person of ordinary skill in the art, without departing from the scope of the invention.

Figure 3:
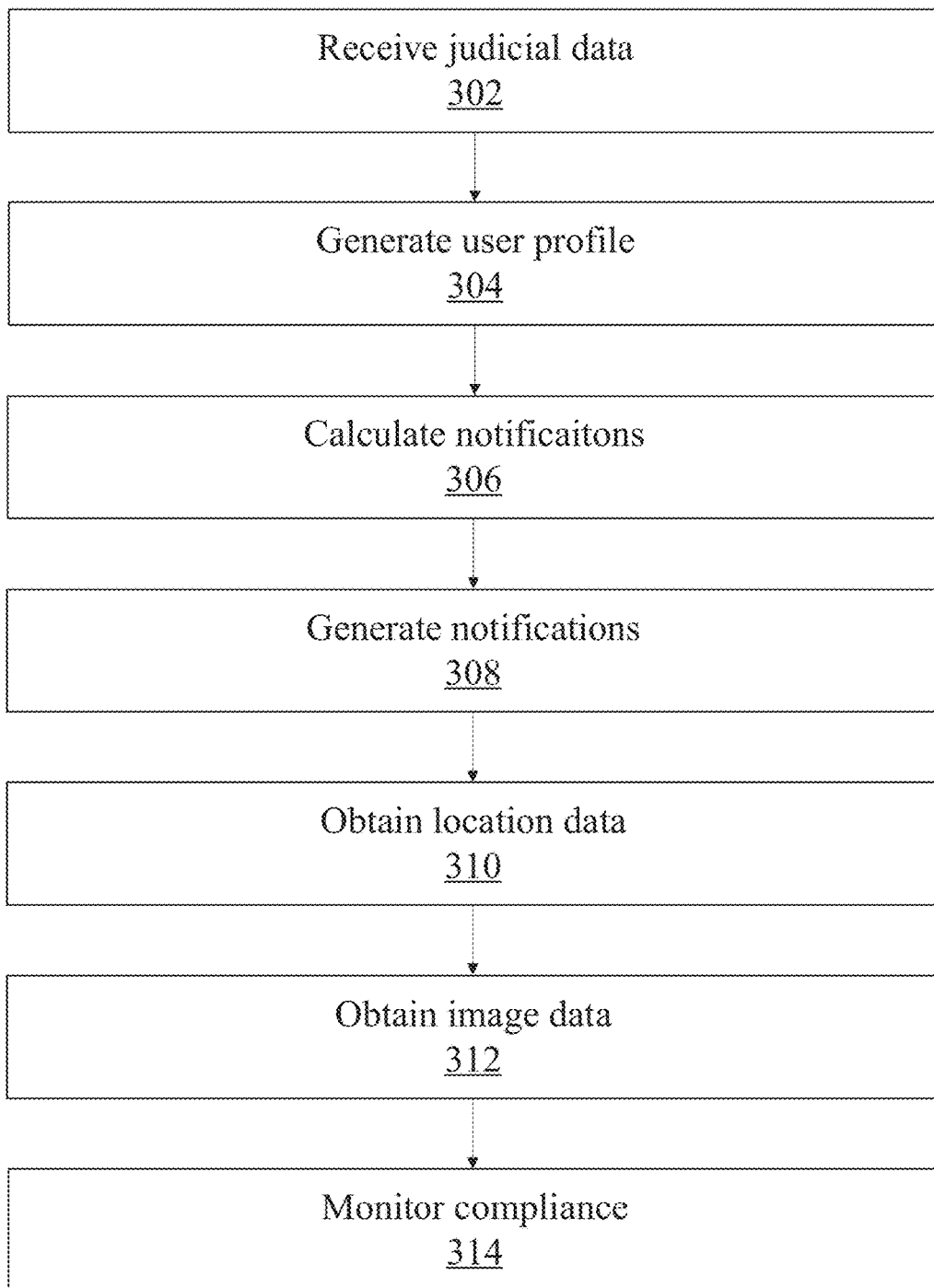
FIG. 3 illustrates a flowchart for monitoring a parolee in accordance with an exemplary embodiment of the present invention.

FIG. 3 illustrates a flowchart for monitoring a parolee in accordance with an exemplary embodiment of the present invention. The process starts by obtaining judicial data 302 for individual parolees. The judicial data may include name, address, birthday, court appearance dates, and drug testing dates.

After obtaining judicial data 302, the process generates a user profile 304 which is sent to the parolee's mobile computing device 170. The parolee then responds according to the parameters requested. The user profile is stored and may be accessed by the supervision officer's computing device 110 as needed.

After the user profile is generated 304, the process will calculate notifications 306 to be sent to the parolee's mobile computing device 170 and the supervision officer's computing device 110. The notification parameters may be established by the supervision officer or court or in some other way that is apparent and obvious to someone skilled in the art.

Once the notifications are calculated 306, the process will generate notifications 308 on a predetermined basis and send notifications to the parolee's mobile computing device 170 and/or the supervision officer's computing device 110. The parolee will then respond to the notifications through his/her mobile computing device 170 to ensure compliance. If non-compliance is detected, the supervision officer's computing device 110 will receive a predetermined notification.

The process may obtain image data 312 from the parolee's mobile computing device 170 which may be accessed by the supervision officer's computing device 110. Exemplarily, as part of a check-in event, the end user will perform an image capture of himself, a selfie, or provide other visual evidence that he is with the end user device, such as the mobile computing device 170 of FIG. 1. In addition, the check-in event can be performed as part of other events, such as agenda events and curfew events. For example, in some embodiments, the curfew event will not officially start or be counted in the system until the end user has sent the image data from the parolee's mobile computing device 170. That is, in some embodiments, the random pinging time frame and frequency for the curfew event, as defined in further detail below, may not start until this action is performed. In other embodiments, an agenda event may not be completed until the end user provides image data illustrating that the task detailed in the agenda event has been completed via image data from the parolee's mobile computing device 170.

Finally, the process will continue to monitor compliance 314 with the parameters indicated by the supervision officer and will provide notifications as instructed. While the process is monitoring compliance 314, notifications may be sent when a parolee fails to check in within a predetermined time frame, or if a parolee's mobile computing device is outside a specified geographic area, or if a parolee fails to appear at a court hearing or at other court mandated location.

Exemplarily, the monitoring of the end user compliance of step 314 can include scoring of the end user's compliance or generating a score for the end user's compliance. Exemplarily, the end user's activities, including location data and a comparison to geographic features defined for the end user can be compiled. In some embodiments, the scoring can include scores for maintaining the proper geographic boundaries, not entering restricted areas, and accounting for times where the end user is recording being in violation of these and other boundaries. In addition, the scoring report can include scores based on the end user's promptness in responding to notices, agenda events, and required check-in events. In additional embodiments, these scores and the time stamps at which certain events are recorded can be collated and generated into a timeline report as described below, for example, in FIG. 9.

Further embodiments of the exemplary system described in FIGS. 1 and 2 and the method of FIG. 3 may be directed towards flexible security profiles. These flexible security profiles may be adjusted to satisfy the requirements of an administrator monitoring end users. Exemplarily, the administrator can monitor the end users via the end user devices of the end user via communication with the end user through apps installed on the end user device. In some embodiments, the administrator may act as a parolee monitoring capacity. In a parolee monitoring capacity, the end users may subject to high security measures. Other additional high security measure embodiments can include pretrial monitoring and in the capacity of monitoring persons in custody released via bail bond by a bail bondsman. In other exemplary uses, a low security measure scenario can be employed. In low security measure scenarios, an employer may wish to monitor the location and actions of employees. For example, delivery drivers, pool cleaners, and nurses on assignment or in a hospital can be monitored.

In these scenarios, two exemplary types of tracking requests can be sent to an End User from an administrator. For example, in a high security measure embodiment, the administrator can choose to engage an active approach where check-ins, agendas, and curfews are employed. These exemplary active measure can require the action of the end user picking up a registered smart phone, taking a real time selfie, singing it, and sending the photo or other check-in information to the supervisor or administrator. In examples of the passive tracking scenario, the application may be running be it in first exemplary plane where the app is opened or in a second exemplary plane, or in the background, where the app is running but not open. In some embodiments, the app will be provided or stored on an end user's smart phone while in other embodiments, other electrical devices with internet connectivity may be used, such as a smartpad or laptop.

In exemplary embodiments, a security profile for compliance monitoring of a parolee can be generated by the administrator. Exemplarily, the security profile can identify one or more of basic features, geographic features, and identification features to facilitate the monitoring of the end user through the end user device. In some embodiments, the basic features can include one or more of a check-in event, an agenda event, a curfew event, and a timeline event. The curfew event can include a data request for at least one of geo-location of the recipient mobile device, a time-block defining a curfew start time and a curfew end time, a time window for sending pings to the recipient mobile device within the time block. Exemplarily, the time window is a subset of the time period and a frequency of pings are sent to the recipient mobile device within the time window. Exemplarily, the curfew event can start with the end user being notified of the curfew event. In additional embodiments, the time-block for the curfew event can be initiated once the end user conducts an initial check-in for the curfew event. Once the check-in has been completed then the time-block and the frequency of pings can commence. In additional embodiments, the initiation of these time-blocks and the frequency of pings may commence at a random time within the curfew event.

In additional exemplary embodiments, the geographic features for security profile can include areas to which the end user must maintain a physical presence. In some embodiments, the geographic features can include a geofence that defines the areas to which the end user is confined. In other embodiments, the geographic features can include geographic areas to which the end user is forbidden from entering. In some embodiments, the geographic areas can include a curfew event area, such as a smaller area such as a domicile, a block, an apartment complex, or other area to which the end user should stay during the curfew event. In some embodiments, future curfew event locations have been defined by the location of the first curfew. In additional embodiments, a small geofence is created within 100 feet of the check-in GPS location. If the end user where to leave that area the administrators would be notified. Thus, eliminating people doing their curfew and then leaving their homes. In additional embodiments, the geographic features can include wider areas to which the end user is confined during non-curfew events.

In additional exemplary embodiments, the identification features for the security profile can include a check-in event. Exemplarily, the check-in event can be an instance or process where the end user can identify himself through the end user device. In some examples of the check-in event, the user may use an imaging device on the end user device to take a self-image, or have a third person take an image of the end user, to confirm that the end user is present with the end user device. In additional embodiments of the check-in event, the end user can use the touch-glass feature of the end user device to physically sign that he is present with the end user device. In yet other embodiments of the check-in event, the end user may be required to scan a QR code or other image to confirm that the end user is a certain location with the end user device. In additional embodiments, the check-in event can require the end user to engage in a chat, instant message, or video chat communication via the end user device through the equipment of the administrator.

In another exemplary embodiment of the present invention, an agenda event can include a set of directions for the end user. Exemplarily, these instructions for the agenda event are provided by the administrator. In some embodiments, the agenda event can include reading materials to be read by the end user through the end user device. In additional embodiments, the agenda event can include instructions to travel to a certain location and check-in at that location. For example, the end user may be instructed to travel to a support group, a half-way house, drug testing, job training, court appearance, or other appropriate activities and events. At these events, the end user may be required to check-in with a third party. The third party can then provide the user a code, a QR code, a signature, or other confirmation that the end user has successfully arrived and participated in the required activity. In other embodiments, the end user can self-certify by performing a check-in as well as by providing images of his surroundings or by scanning a QR code or another image. In some embodiments, the geo-fence or geographic features can be modified by the administrator to allow the end user to travel to the defined location without violating the geographic features.

Figure 4:
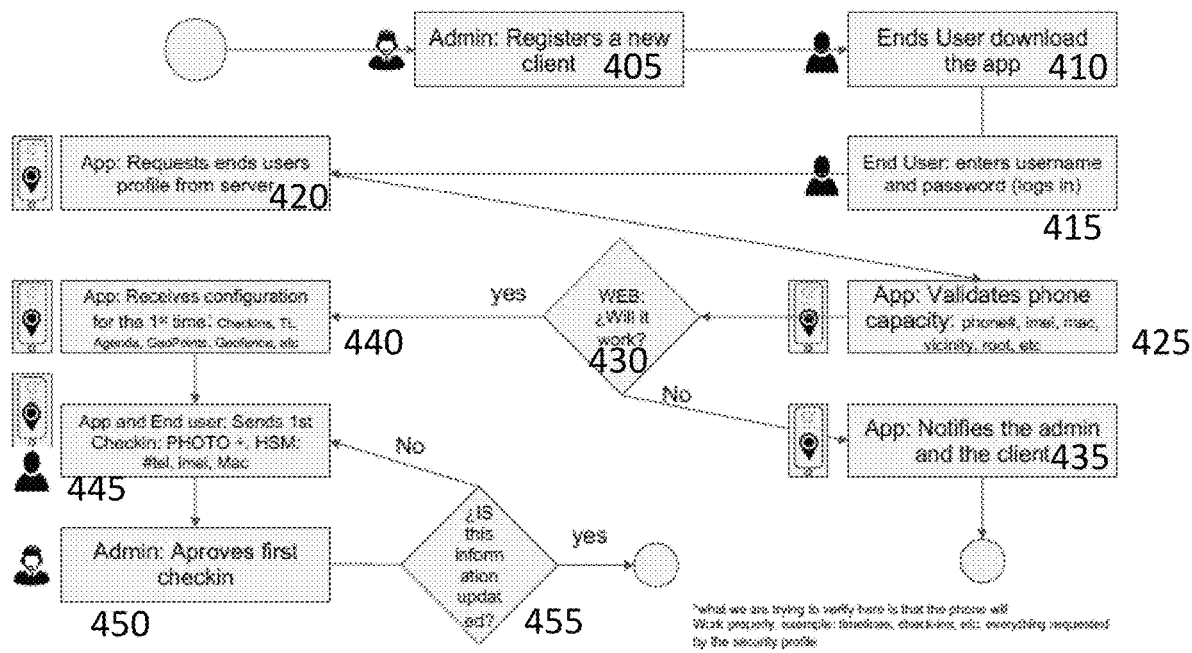
FIG. 4 illustrates a flowchart for registering a parolee in accordance with an exemplary embodiment of the present invention.

FIG. 4 illustrates a flowchart illustrating exemplary method 400 for adding a new user to a security profile by an administrator of the system as one embodiment of step 304 of FIG. 3 where a user profile is generated. Furthermore, the embodiment of method 400 may be performed on exemplary instances of the devices and systems illustrated in FIGS. 1 and 2. Returning to FIG. 4, method 400 may exemplarily start at step 405 where the administrator registers a new client, also referred to as the end user, the person for whom the app and smart phone, or other end user devices, will be registered. Exemplarily, in step 410, the end user downloads the app onto the end user device. In some embodiments, the end user can download the app from an online store, from the administrator's website or file storing site, or the end user can obtain a smartphone with the app already pre-loaded. Then, in step 415, the end user can exemplarily register by providing a username and password. In other embodiments, the end user may be pre-assigned with these log-in credentials. Once the end user has logged in in step 415, the administrator can, in step 420, receive the log-in information from the end user's device or smart phone.

Exemplarily, once the administrator receives the end user information, step 425 exemplarily includes the administrator instructing the app to validate the end user smart phone or other end user device. In step 425, the validation can include checking whether the smart phone or other end user device being registered meets the minimal requirements. Minimal requirements can include the presence of a location device, such as GPS capacity, as well as ensuring the device includes an image device, such as a camera and the ability to record images. Other validation steps can exemplarily include checking the smart phone's phone number, an (International Mobile Equipment Identity) IMEI number, location information, and other appropriate data. Exemplarily, the verification can determine if the smart phone or end user device will work properly according to the end user profile.

In step 430, a determination is made as to whether the end user device meets these requirements. Exemplarily, this step can be performed on the server or via a web-based decision-making website. If the end user device fails the requirements check, then in step 435, the administrator is informed, and the administrator can inform the end user of this issue. Upon a successful validation of the end user device, then in step 440, the app on the end user device can receive a first-time configuration. The first-time configuration can exemplarily include providing the device with check-in times, a timeline, an agenda, geo-point information, and geofence information.

Upon the completion of step 440, the app can perform step 445 where the end user performs a first-time check-in via the app on the end user device. In some embodiments, the first-time check-in can include a first photo of the end user via the end user device. Other information can also be collected and relayed to the administrator at this point, such as the phone IMEI, phone number, and location information. The administrator receives this information and in step 450 approves the first check in. Exemplary, the photo may be verified to determine if it matches the end user. In step 455, the first-time check-in can be checked to ensure the information is for a new profile or includes proper information. Upon the completion of step 455, method 400 can return to step 445 to retry the first-time check-in or the registration is completed in step 460.

Figure 5:
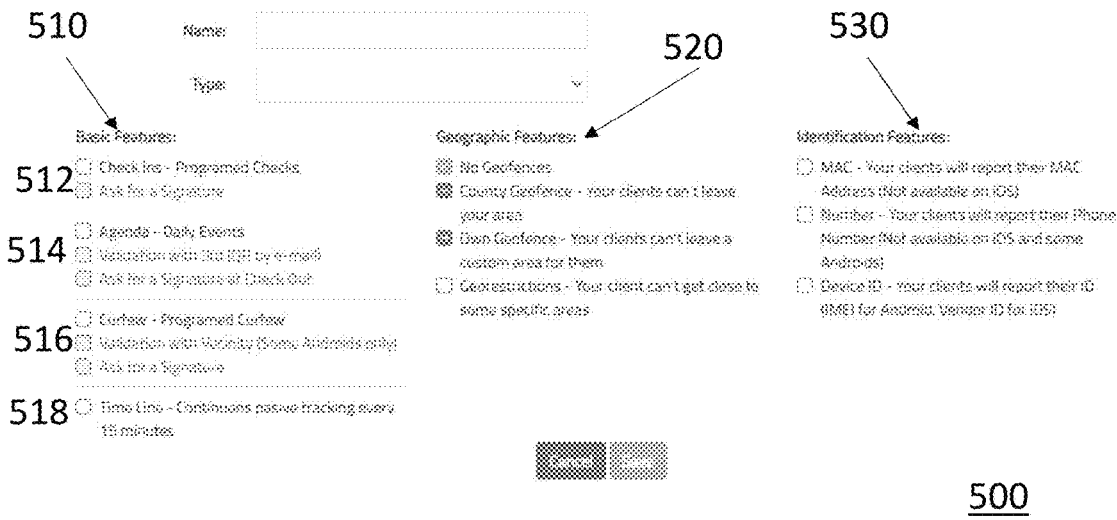
FIG. 5 illustrates an exemplary interface for defining a security profile for a parolee according to an exemplary embodiment of the present invention.

FIG. 5 illustrates an exemplary user-interface that may be presented to a computing device associated with an administrator. Exemplarily, the administrator can select various options presented in the user interface illustrated in FIG. 5 to generate a security profile for a parolee. The administrator's selection of the various options may be based on, for example, judicial order or other requirements that the parolee must comply with, and/or administrative requirements associated with the local parole administration system. In one embodiment, the various optional elements illustrated in FIG. 5 may be preset based on specific requirements and/or preferences associated with each parole administration agency and/or based on judicial order documents that are uploaded into the server and/or obtained from court records data.

As illustrated in FIG. 5, the elements of a security profile may be comprised of basic features 510, geographic features 520, and identification features 530.

Exemplary basic features 510 may be comprised of check-in events 512, agenda events 514, curfew events 516, and time-line events 518. Each of the basic feature 510 events may be comprised of additional rules and/or sub-requirements which may be optionally selected by a parole administrator. More specifically, each basic feature 510 event may be comprised of rules regarding timing of pings that may be sent to the parolee's mobile device, frequency of pings that may be sent to the parolee's mobile device, and/or duration of pings that may be sent to the parolee's mobile device. In addition, each event may be comprised of rules regarding data that must be obtained from the parolee, wherein the documents may help establish whether the parolee is in compliance with conditions of his or her parole. Requests for additional data and/or documents may include, for example, a signature of the parolee to verify the veracity of the parolee's response to a ping, notes, reading material that the parolee may be required to read, responses or notes associated with the reading material that the parolee may have written down, etc. In some embodiments, the event may require data from third-parties other than a parolee, a parole officer, or the parole administration, including, but not limited to a half-way house administrator, a support group administrator, a drug test administrator, etc. In these instances, the third-party may scan data that is presented to the parolee's mobile device, such as, but not limited to a QR code. The scanned data may be transmitted from the third-party's computing device to the check-up system 120. In other embodiments, the parolee may be required to scan a code or an identifier that is located at a specific geo-location via the parolee's mobile device. The can data may be sent to the check-up system 120. In other examples, geo-location data associated with the user device at the time of the ping (and/or at the time that a response to the ping is generated) may be required as part of an optional sub-requirement associated with a basic feature 510 event.

Each basic feature 510 event (for example, check-in events 512, agenda events 514, curfew events 516, and time-line events 518) may have a specific rules regarding pings that are sent to a parolee's mobile device. The rules may specify the timing of pings, frequency of pings, and/or duration of pings that may be sent to the parolee's mobile device. Additionally, each basic feature 510 event may specify tolerances for when responsive data in response to a ping must be received from the parolee's mobile device before the parolee's response is deemed non-compliant.

For example, a check-in event 512 may specify a specific time for sending pings to the mobile device of the parolee. The time may be the same for each day of the week, may vary according to a pre-set schedule or may be randomized. As mentioned above, a check-in event 512 may additionally and/or optionally require certain data from the parolee's mobile device including but not limited to a picture of the parolee that is taken contemporaneously (i.e. not retrieved from the mobile device's long term storage and/or having a time-stamp or metadata identifying that the picture was taken within 30 seconds or some other threshold of submitting responsive data in response to the ping). Additionally, the check-in event 512 may require the parolee's mobile device to submit a geo-location associated with the mobile device's current location. The geo-location information may be comprised of, for example, GPS location. Additionally, the check-in event 512 may require the parolee's device to submit cell tower information associated with the uplink/downlink of data and/or cellular service on the parolee's mobile device 170. Additionally and/or optionally as selected in the parolee's security profile, signature may be required to be provided by the parolee when a check-in ping is received and/or when a response to the ping is generated and/or sent to the servers. Additionally, or optionally, the check-in event 512 may specify a tolerance within which time a responsive submission must be received from the parolee's mobile device. For example, a check-in event 512 may specify that a response must be received from the parolee's mobile device within 30 minutes of sending a ping. The specific times frames may vary, as would be understood by persons of ordinary skill in the art, without departing from the scope of the invention. If a response is not received within a particular time frame, then the parolee's response may be deemed non-compliant. In one embodiment, a score may be assed based on the timeliness of the parolee's response as described in reference to FIG. 3.

The agenda event 514 specifies a variety of requirements for pinging the mobile device 170 of a parolee as well as responsive data that may be requested from the parolee's mobile device 170. In one embodiment, the agenda event 514 may specify a time for sending pings to the mobile device 170 of the parolee. The time may be the same for each day of the week, may vary according to a pre-set schedule or may be randomized. Additionally, the agenda event 514 may specify a duration of the agenda, including but not limited to, a start time and an end time, and/or frequency of pings to send to the parolee's mobile device during the agenda event. Additionally and/or optionally, the agenda event 514 may require submission of certain data from the parolee's mobile device 170 and/or the computing device of a third party. The additional/optional required data may include, but is not comprised of, geo-location data associated with the parolee's current location, including but not limited to GPS coordinate data, image files from the parolee's mobile device wherein the image file is taken contemporaneously of being sent to the checkups system 120 (or within a threshold period of time), and the like. In one embodiment, the agenda event 514 may require third party data and/or data from a third party device.

The curfew event 516 may also specify a variety of requirements for pinging the mobile device 170 of the parolee as well as responsive data that may be requested from the parolee's mobile device 170. In one embodiment, the requirements associated with the curfew event 516 is comprised of data request for at least one of geo-location of the recipient mobile device, a time-block defining a curfew start time and a curfew end time, a time window for sending pings to the recipient mobile device within the time block, wherein the time window is a subset of the time period, and a frequency of pings to send to the recipient mobile device within the time window.

The timeline event 518 can include tracking the end user device at predetermined time intervals. In addition, the timeline can provide the administrator with a visual reference of these tracking events and other events monitored by the end user device. Other exemplary end user profile creation tools can include geofences that can include locations that the end user device, and therefore the end user, cannot leave or cannot enter. The end user profile creation tool can further specify a media access control (MAC) address reporting by the end user device, a client number reporting requirement, and a device ID requirement where the end user device reports its IMEI or Vendor ID where appropriate.

Exemplarily, the administrator can be provided with tracking information 540 that is received from the end user device. Exemplary tracking information can include precise smart phone verification. Examples of smart phone verification can include checking the cell phone number for the end user device, a MAC address for the end user device, an IMEi number, or a vendor ID for the device. Additional tracking information can include vicinity verification through cell tower polygon confirmation, cell phone tower triangulation, and GPS reports from the end user device.

Additionally, geographic boundaries 530 can be defined by the administrator through the system. Exemplary control of the geographic boundaries can include control of geofence requirements. Exemplarily, the geofence can be specified for an end user rather than simply requiring the end user to remain within a geofence defined by a metropolitan or other large area. Additional exemplary geographic boundaries can include georestricted locations that the end user is not allowed to enter. In additional embodiments, the end user, as tracked by the end user device, which must remain with the end user as part of his or her participation in a high security measure system can include defining a curfew for the end user.

Additional protective security measures can include identifying misuse of the app or the end user device by viewing root permissions. Exemplarily, viewing root permissions will be enabled for the end user device for the app to monitor. Another exemplary protective security measure can include instant location being request from the end user device by the app, and sent by the administrator, via a push notification where the administrator can receive and view the location of any user device registered with the administrator.

In additional embodiments, various end user confirmation events can be instituted. Exemplary instances of end user confirmation events can include a QR agenda confirmation event. A QR agenda confirmation event can include the end user being required to scan a QR code at a certain time or place. Another end user confirmation event can include requiring a written or digital signature to be provided by the end user. Exemplarily, the end user must provide a signature, for example being hand drawn on the surface of the smart phone where the signature is recorded and provided to the administrator. In another end user confirmation event, the end user is required to take self-images as directed by the administrator through the app. Exemplarily, these images will be taken by the smart phone's camera and transmitted, via the app, to the administrator. In additional embodiments, the images can be moving images such as gifs or videos. In addition, the end user may also be required to sign the image as described above.

Exemplarily, the apps on the end user devices have API REST enabled to ensure servers for a web suite providing administrative services are available. This can allow for administrator side actions even when the apps are not actively communicating with the web suite or servers of the administrators to minimize drainage of the end user device battery or overusing the subscriptions or data plans for the end user device. Exemplarily, the channels the servers and the app use to communicate can be encrypted to maintain a private internet connection and to prevent any outside modification of messaging between the end user and administrators.

Exemplarily, the channel utilized for transferring information between the end user device and the servers is not always on to minimize battery usage for the end user device. Instead the end user devices can be configured to store the various information (e.g., a timeline, agenda, check-in, etc.) collected by the end user devices until they have been awoken by the end user and can transfer data. This process can depend on the latency of the devices but in average a smart phone user wakes up his/her smart phone 52 times per day. Exemplarily, the app can work without being connected or talking with the server and information that was collected may be transmitted once there is a reestablish of a connection with the system, cell towers, or internet. By minimizing server interactions, the amount of data being by the end user device can be minimized, allowing the end user device to not require long battery life or expensive data plans.

Figure 6:
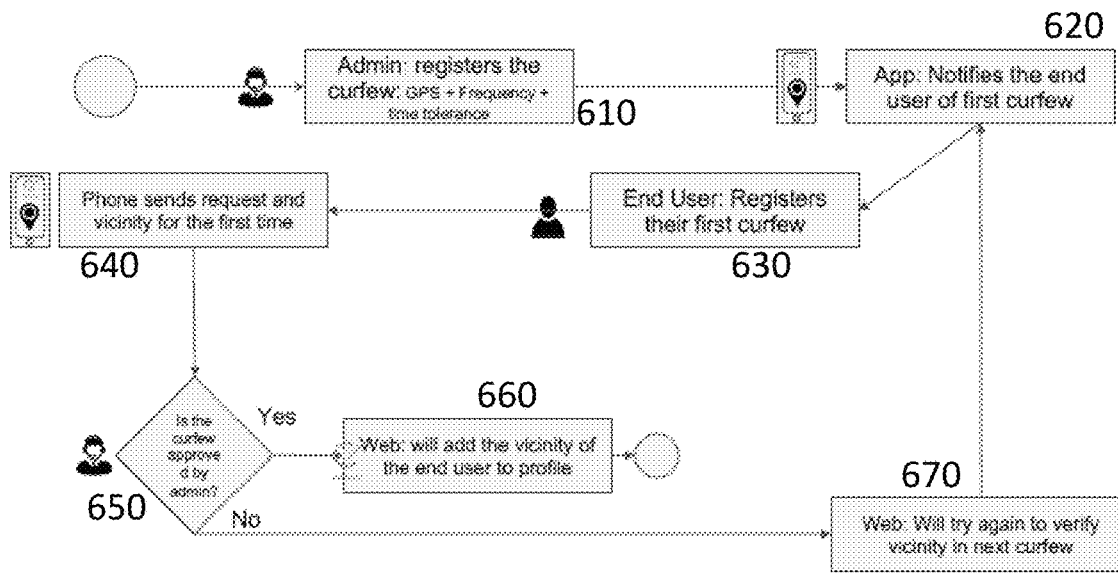
FIG. 6 illustrates a flowchart for registering a first curfew for a parolee in accordance with an exemplary embodiment of the present invention.

FIG. 6 illustrates exemplary method 600 in which a curfew, such as the curfew event selected in FIG. 5, for an end user is performed. Exemplarily, in step 610, the curfew requirements are entered into the system by the administrator, as exemplarily illustrated above in step 440 and in FIG. 5, as well as being one embodiment of step 308 illustrated in FIG. 3. Exemplarily, in step 620, the app notifies the end user of either the beginning or the end of a first curfew. Exemplarily, the first curfew will inform the app and the administrator of details of the end user's curfew area to determine future curfews. In some embodiments, this curfew area can be an area of about 100 feet surrounding the point at which the end user performed the first curfew check-in. In other embodiments, this curfew area can be limited to a domicile, building, or apartment complex at that location. For example, in step 630, the end user will register the first curfew with the app in the end user device.

Registering the first curfew can be performed by interacting with the app as directed by instructions provided from the app to be performed by the end user. First curfew information can include location information for the end user device during the first curfew time period. This can exemplarily set a geoboundary, or geographic feature, for the end user as it should generally conform with the end user's domicile or residence. In some embodiments, this curfew geoboundary can defined as a 100 feet from where the first curfew check-in occurs. In step 640, the app directs the end user device to transmit this first curfew information to the administrator. In step 650, the administrator can review the first curfew information and either approve that information. For example, the administrator may observe that the first curfew check-in is taking place in a non-approved location or an abode or domicile that is not associated with the end user's profile. Approved first curfew information is then added to the end user profile for future curfews in step 660. In instances where the administrator denies the first curfew information, step 670 will reset to step 620 to reattempt to the first curfew process.

Exemplarily, the timing of pinging events within a curfew can be randomized so as to happen between any one hour to prevent the end user from predicting the timing of the curfew. That is, one the curfew event is initiated, and the end user performs a check-in for the curfew event, the process of determining a random period of time can take place. In some embodiments, the random period of time that the end user device may be pinged should be unknown to the end user to ensure compliance with the curfew event because the end user cannot anticipate when the end user device is being monitored. Exemplarily, the curfew is linked to a location, the location exemplarily being determined by a GPS position provided by the end user device or through cell tower location mechanism that triangulates the end user device position from the cell phone towers it interacts with.

Exemplarily, in initiating the curfew from the end user device, the end user provides a check-in. The curfew event check-in can include performing the self-image process where the end user uses the imaging device on the end user device to confirm he is present with the end user device. During the curfew event, the end user device can be pinged by the administrator servers or web suite several times an hour during a random time period to ensure the end user device is not being moved from that location. The curfew event will exemplarily last for a predetermined period of time as exemplarily set by the administrator. Exemplarily, if the curfew is not complied with by the end user, a notification can be provided to the administrator. In addition, the end user device can continue to monitor device for a period of time after the curfew ends. Check-ins during the curfew can take place via an interaction with the app on the end user device, including signatures and image taking. By limiting the pinging during the curfew, the end user device battery and data plan may not be overly taxed. In additional examples, if the end user device is being charged during this time, the end user device may be continually pinged.

Exemplarily, the administrator can receive constant notification of end user events. In some embodiments, these events can be provided to the administrator via a web suite. The web suite can be exemplarily be part of the check-up system 120 illustrated and defined in FIG. I and the compliance monitoring system 210 illustrated and defined in FIG. 2. Via this web suite, the administrator can exemplarily control the rules and events for an end user. Changes to these rules will set forth a chain reaction of notifications within the system to let all other administrator know of these changes, where appropriate depending on permissions as required within an organization. For example, there may be several tiers of administrator within an organization, and some administrators may have different authorization levels.

Figure 7:
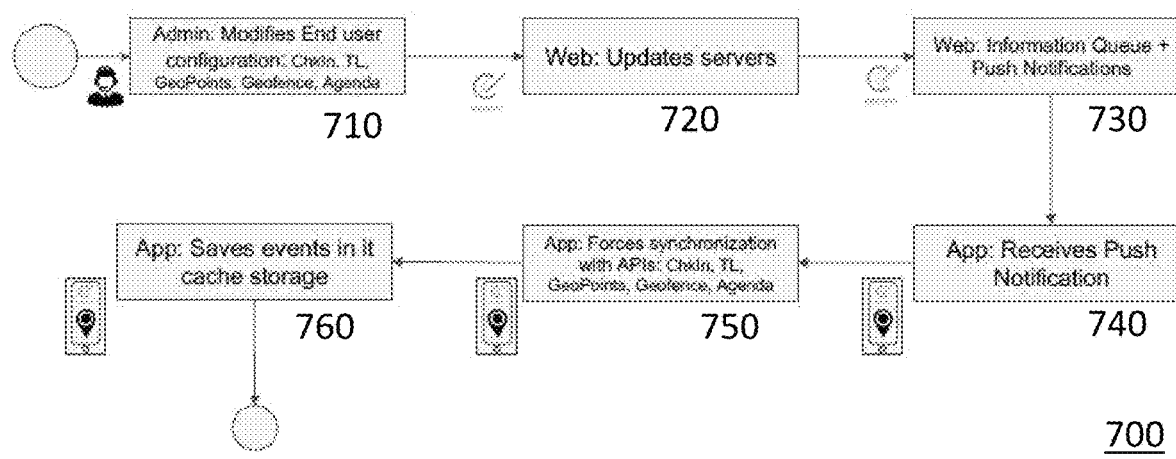
FIG. 7 illustrates a flowchart for updating a security profile for a parolee in accordance with an exemplary embodiment of the present invention.

FIG. 7 illustrated an exemplary method 700 for modifying an end user account. Exemplarily, in step 710, an administrator accesses the system to modify the end user profile. These modifications can include changes to check-in times, a timeline, the end user's geographic features and/or geofence, and agendas to be provided to the end user via the app operating on the end user device. Exemplarily, in step 710, webservers can update the servers for the system and in step 720 the webservers can update information queues and push notifications for the end user profile. Then, in step 730, the app on the end user device can receive these push notifications. Upon receiving these push notifications, the app can force synchronization of information contained in these notifications with the various functionalities of the app which takes place in step 740. Method 700 can then be completed in step 750 where these changes are saved within the app in the end user device.

Another end user confirmation event can be the creation of and distribution of forms, as previously discussed with respect to the agenda events. Exemplarily, the end user would be required to be at a certain location at a predetermined time. In addition, in an agenda event, the forms can be created by the administrator via the system. The end user can then fill out the form, answer any questions contained within the form, and provide feedback through the form. The completed form can then be broadcast through the device back to the administrator. Additional embodiments of the agenda can include a requirement that the end user be present at a certain location. In additional embodiments, the agenda can require the end user to interact with a person, computer, or interface at the certain location. For example, in some instances, the end user may be required to perform a check-in at the certain location. In other instances, the end user may be required to scan a QR code or take other images at the certain location.

Figure 8A:
FIG. 8A illustrates an exemplary interface for an agenda for a parolee to perform according to an exemplary embodiment of the present invention.
Figure 8B:
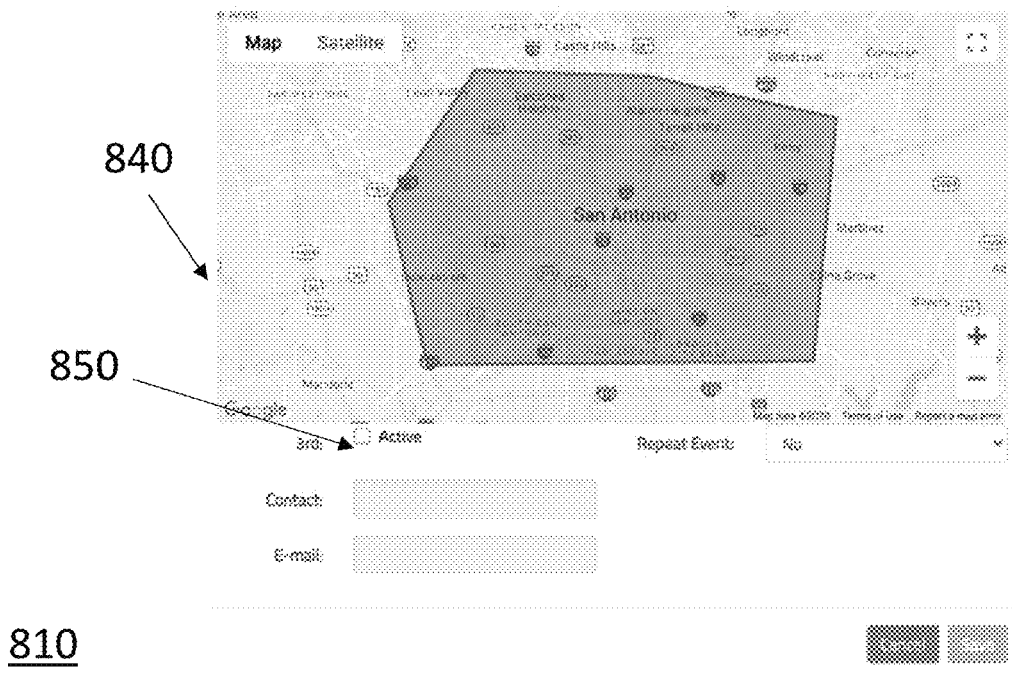
FIG. 8B illustrates an exemplary interface for an agenda for a parolee to perform according to an exemplary embodiment of the present invention.

FIGS. 8a and 8b illustrate an exemplary interfaces 800 and 810 for the administrator to create and monitor the performance of an agenda event by the end user. Exemplarily, the administrator can use these interfaces to define when and where the end user will perform a check-in according to this agenda event as illustrated in interface 800 of FIG. 8a. In some embodiments, the administrator can choose dates from a calendar function 820 for the end user. In addition to selecting a time for the agenda event to take place, the administrator may also select a time tolerance for the end user to perform the agenda event. After selecting a time and date for the agenda to take place, the administrator can detail or select an area, building, region, address, or location 830 at which the agenda event will take place. The administrator can also use the map function 840 to create geographic boundaries or define the check-in area for the agenda event. In additional embodiments, the administrator can then use the interface 810 of FIG. 8b to select whether the end user is meet third parties during the agenda event. In addition, the administrator can provide notes to the end user through this interface. In addition, the administrator can select whether a third person or party 850 will take part in this agenda event.

In additional embodiments, the administrator can include additional information for the end user to read or acts to perform which can be specified in notes section 830 of FIG. 8a or through additional interfaces for creating the agenda event. These acts can include scanning a QR code at the location, taking an image at the location, or signing a signature through the app on the end user device. In addition, the administrator can provide an email to a third party in the event the end user is to meet with that third party as part of the agenda. In some instances, the third party may be provided with the QR code so that the end user will have to interact with the third party to obtain the QR code. In exemplary instances of this agenda, the end user, such as a parolee may have to meet with a third party to receive training, perform a test, or to fulfill conditions of the parole.

At a predetermined time before the agenda begins, the end user will receive a notification of the agenda event. Exemplarily, a score can be assessed for the agenda based on how close the end user comes to the check-in point and how prompt the end user is at performing the check-in. In addition, FIG. 9 illustrates a timeline report 900 according to embodiments of the present invention. In some embodiments, the timeline can be provided to the administrator to detail activities of the end user, alerts generated by the end user device, and other information as they occurred according to when those alerts or events occurred. The timeline report 900 can be one exemplary embodiment of the monitoring compliance step 314 of FIG. 3. In addition, the data contained within the timeline report 900 can be used as part of the scoring criteria for the end user.

Exemplarily, the administrator can select the timeline feature which can ping the end user every 15 minutes, or at another determined frequency. Exemplarily, the timeline will compare the end user device location to the geographic feature requirements for the end user as set by the administrator and give it a score. For example, if the end user device is pinged and found to be inside the geofence, this can be given a score, as discussed above with respect to step 314 of FIG. 3, and if the end user is found to be close to the geofence then less points can be awarded. In events where the ping shows the end user is outside the geofence, the end user loses more points. In additional embodiments, other factors can be considered. For example, the score can reflect if the timeline was sent on time or it was stored by the phone and sent later, or if the timeline was sent at all. Once the information is received and analyzed, the result is placed in the timeline of the individual so the administrator can view the historic data at any time. If one if these timelines is not inside the geofence, the administrator will receive an email notifying them of this. In additional embodiments, a heatmap can be created if a supervisor wants to compare all of these timeline points in a visual manner.

Exemplarily, the check-in event, sometimes referred to as a checkup, can use push notifications to notify the individuals of any request made by their administrator. The end user can click on the notification to be taken to the app where they can fulfill the request by their supervisor. Other push notifications that may be sent can include court dates, appointments dates, agenda events, curfew event, other check-in events, random check-in event, a check-in event when the end user is found to leave their geographic region fence, a check-in event when the end user is found inside a geographic restriction area. Push notifications may be sent by the server or may be sent directly by the administrator. Exemplary push notifications can then result in the end user device notifying the end user of the notification.

Exemplarily, these events have a time tolerance level (15 min, 30 min, 1 hour, 4 hours, 8 hours, 12 hours) that are selected by the administrator at the time of creation of the event. If the time passes the end user will also receive a notification. This also tracks the time it takes the end user to respond and is also part of the score calculation related to the timeliness or punctuality of the response. In addition, these time tolerances can be incorporated into the end user's score as discussed above in FIG. 3.

An exemplary check-in that may take place on the end user device through an app in accordance with various embodiments of the present invention. Exemplarily, the end user can select the appropriate responses through the app on the end user device. As discussed above, the end user can respond to the check-in event by chatting with the administrator, providing an image, providing a signature, or by performing other tasks as required by the administrator. Furthermore, the app can signal the successful completion of a check-in event on the end user device in accordance with various embodiments of the present invention. Exemplarily, the end user can complete these tasks through the app and the app will communicate through the end user device to the hardware of the administrator.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 10:
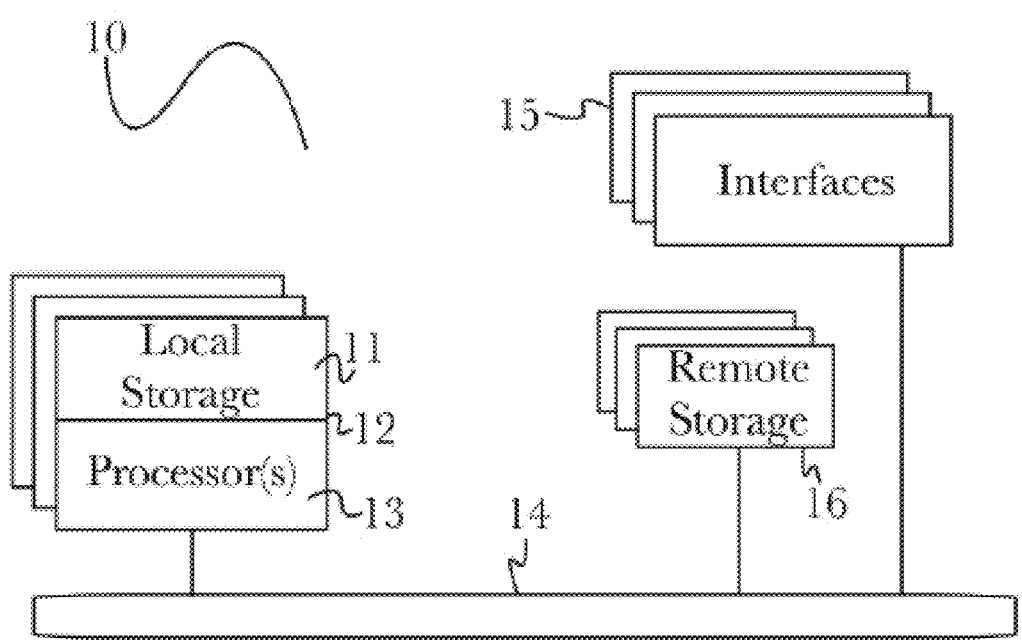
FIG. 10 illustrates an exemplary illustration detailing alerts provided to the parolee end user device according to an exemplary embodiment of the present invention.

Referring now to FIG. 10, there is shown a block diagram depicting an exemplary computing device 10 suitable for implementing at least a portion of the features or functionalities disclosed herein. For example, the computing device can perform the methods 300, 400, 600, and 700 of FIGS. 3, 4, 6, and 7, respectively. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 10 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 11:
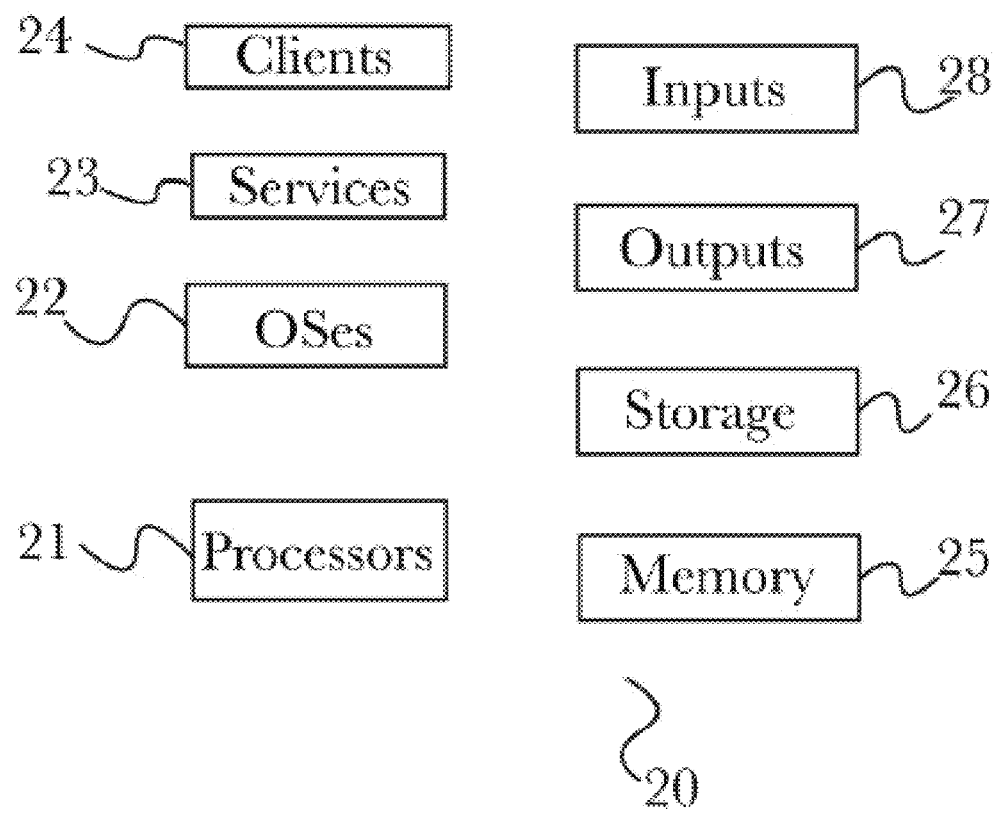
FIG. 11 illustrates one embodiment of components of an example machine able to read instructions from a machine-readable medium and execute them in a processor (or controller).

In some embodiments, systems may be implemented on a standalone computing system. Referring now to FIG. 11, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 10). Examples of storage devices 26 include flash memory, magnetic hard drive, CD-ROM, and/or the like.

Figure 12:
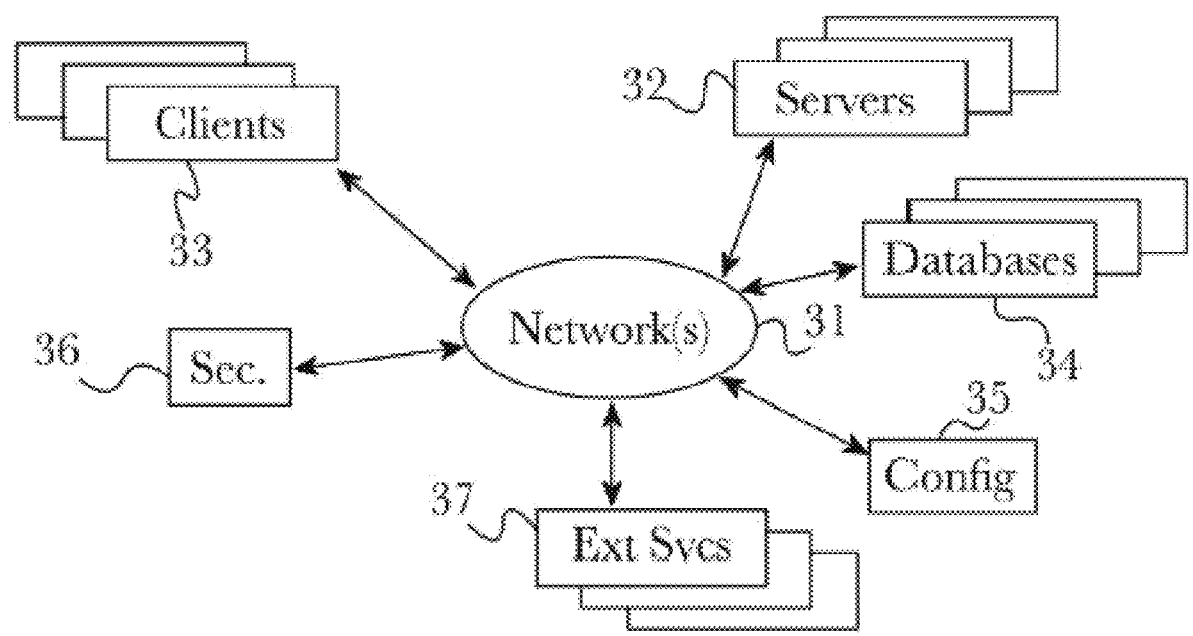
FIG. 12 illustrates on embodiment of the computing architecture that supports an embodiment of the inventive disclosure.

In some embodiments, systems may be implemented on a distributed computing network, such as one having any number of clients and/or servers. Referring now to FIG. 12, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 13. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. Exemplary instances of the external services 37 can be the location data system 130 of FIG. 1 enabling geographic and mapping features and the notification system 140, also from FIG. 1, enabling push notifications.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 13:
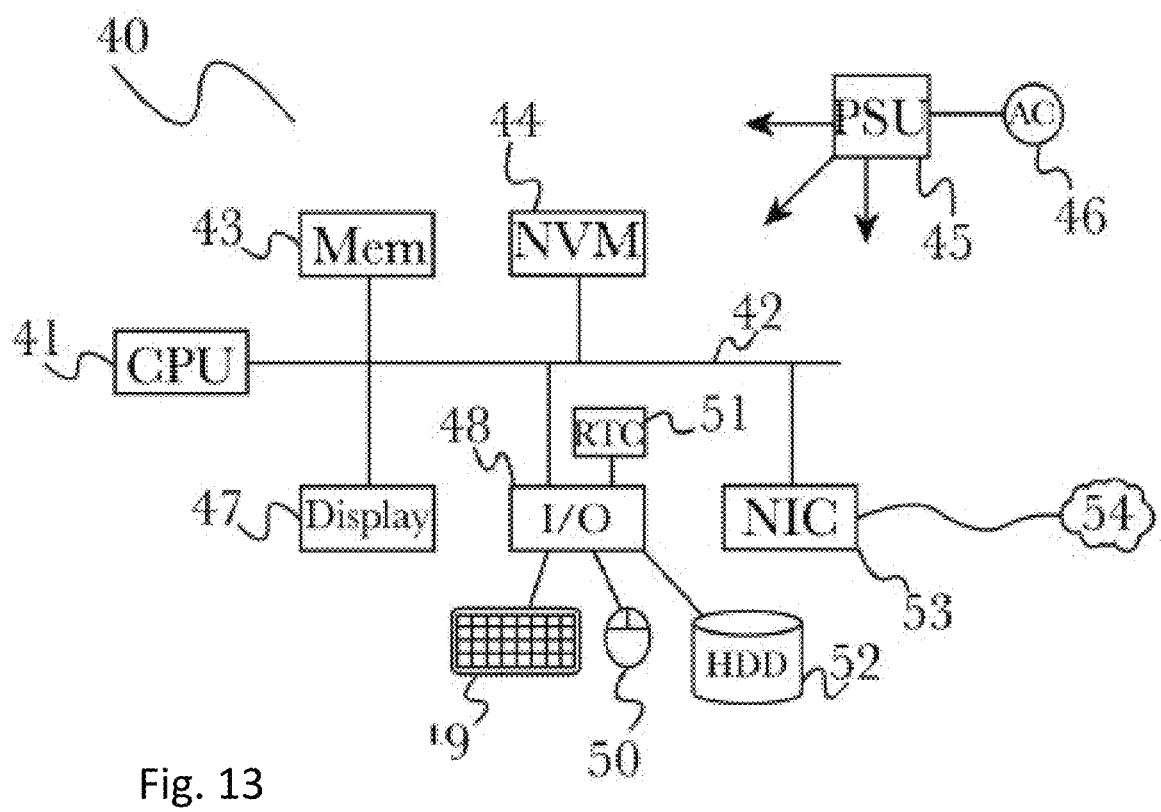
FIG. 13 illustrates components of a system architecture that supports an embodiment of the inventive disclosure.

FIG. 13 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A method for monitoring recipient mobile devices, the method comprising:
    generating, by a system comprising a processor, a security profile for compliance monitoring of a parolee, the security profile identifying at least one of basic features, geographic features, and identification features, wherein the basic features are further comprised of at least one of a check-in event, an agenda event, a curfew event, and a timeline event, wherein the curfew event is comprised of data request for at least one of geo-location of the recipient mobile device, a time-block defining a curfew start time and a curfew end time, a time window for sending pings to the recipient mobile device within the time block, wherein the time window is a subset of the time period, and a frequency of pings to send to the recipient mobile device within the time window;
    generating, by the system, a curfew location-based curfew data obtained from the recipient mobile device;
    sending, by the system, at least one ping to the recipient mobile device in accordance with the time window, time block and frequency information in the security profile;
    receiving, by the system, curfew data from the recipient mobile device in response to the at least one ping, the curfew data comprising at least geo-location data associated with the recipient mobile device;
    determining, by the system, whether the received geo-location data associated with the received curfew data is within a threshold vicinity of the curfew location;
    generating, by the system, a log of sent pings, the received curfew data, and the determination of whether the received geo-location data associated with the received curfew data is within a threshold vicinity of the curfew location; and
    scoring, by the system, the received curfew data, wherein the score identifying a likelihood that the recipient device and the recipient associated with the recipient device was located at the curfew location during the curfew time block.

2. The method of claim 1, wherein the frequency of pings includes a predetermined time period of sending the pings at the frequency.

3. The method of claim 2, wherein the curfew event includes a curfew check-in event before an initiation of the sending of the pings at the frequency.

4. The method of claim 1, wherein the window occurs at a random period of time within the curfew event.

5. The method of claim 1, further comprising:
    sending a first notification to the recipient mobile device, the notification notifying the parolee of a first curfew event;
    obtaining from the recipient mobile device a first registration in response to the first notification; and
    updating the curfew event of the security profile if the first registration is approved by a parole administrator.

6. The method of claim 5, wherein the first curfew event requires the recipient mobile device to register a curfew location for future curfew events.

7. The method of claim 6, wherein the first registration includes a registration input for registering the first curfew event and the curfew location.

8. The method of claim 5, wherein the curfew location defines the geo-location of the recipient device for future curfew locations.

9. The method of claim 1, further comprising generating a report to be provided to the parole administrator if the received curfew data is not within the threshold vicinity.

10. The method of claim 1, further comprising furnishing an agenda to the mobile recipient device, the agenda including an agenda check-in location for the parolee to be present at an event at a predetermined agenda check-in time.

11. The method of claim 10, further comprising receiving an agenda check-in confirmation from the mobile device for the event.

12. A system, comprising:
    a processing system including a processor; and
    a memory, coupled to the processing system, that stores executable instructions and that, when executed by the processing system, facilitate performance of operations, comprising:
        generating a security profile for compliance monitoring of a parolee, the security profile identifying at least one of basic features, geographic features, and identification features, wherein the basic features are further comprised of at least one of a check-in event, an agenda event, a curfew event, and a timeline event, wherein the curfew event is comprised of data request for at least one of geo-location of the recipient mobile device, a time-block defining a curfew start time and a curfew end time, a time window for sending pings to the recipient mobile device within the time block, wherein the time window is a subset of the time period, and a frequency of pings to send to the recipient mobile device within the time window;
        generating a curfew location-based curfew data obtained from the recipient mobile device;
        sending at least one ping to the recipient mobile device in accordance with the time window, time block and frequency information in the security profile;
        receiving curfew data from the recipient mobile device in response to the at least one ping, the curfew data comprising at least geo-location data associated with the recipient mobile device;
        determining whether the received geo-location data associated with the received curfew data is within a threshold vicinity of the curfew location;
        generating a log of sent pings, the received curfew data, and the determination of whether the received geo-location data associated with the received curfew data is within a threshold vicinity of the curfew location; and scoring the received curfew data, wherein the score identifying a likelihood that the recipient device and the recipient associated with the recipient device was located at the curfew location during the curfew time block.

13. The system of claim 12, wherein the operations further comprise:

sending a first notification to the recipient mobile device, the notification notifying the parolee of a first curfew event;

obtaining from the recipient mobile device a first registration in response to the first notification; and updating the curfew event of the security profile if the first registration is approved by a parole administrator.

14. The system of claim 13, wherein the first curfew event requires the recipient mobile device to register a curfew location for future curfew events, and wherein the first registration includes a registration input for registering the first curfew event and the curfew location.

15. The system of claim 13, wherein the curfew location defines the geo-location of the recipient device for future curfew locations.

16. The system of claim 12, wherein the operations further comprise:

furnishing an agenda to the mobile recipient device, the agenda including an agenda check-in location for the parolee to be present at an event at a predetermined agenda check-in time; and receiving an agenda check-in confirmation from the mobile device for the event.

17. A computer program product comprising a non-transitory computer readable storage medium having instructions encoded thereon that, when executed by a processor, cause the processor to perform operations comprising:

generating a security profile for compliance monitoring of a parolee, the security profile identifying at least one of basic features, geographic features, and identification features, wherein the basic features are further comprised of at least one of a check-in event, an agenda event, a curfew event, and a timeline event, wherein the curfew event is comprised of data request for at least one of geo-location of the recipient mobile device, a time-block defining a curfew start time and a curfew end time, a time window for sending pings to the recipient mobile device within the time block, wherein the time window is a subset of the time period, and a frequency of pings to send to the recipient mobile device within the time window;

generating a curfew location-based curfew data obtained from the recipient mobile device;

sending at least one ping to the recipient mobile device in accordance with the time window, time block and frequency information in the security profile;

receiving curfew data from the recipient mobile device in response to the at least one ping, the curfew data comprising at least geo-location data associated with the recipient mobile device;

determining whether the received geo-location data associated with the received curfew data is within a threshold vicinity of the curfew location;

generating a log of sent pings, the received curfew data, and the determination of whether the received geo-location data associated with the received curfew data is within a threshold vicinity of the curfew location; and scoring the received curfew data, wherein the score identifying a likelihood that the recipient device and the recipient associated with the recipient device was located at the curfew location during the curfew time block.

18. The computer program product of claim 17, wherein the operations further comprise:

sending a first notification to the recipient mobile device, the notification notifying the parolee of a first curfew event;

obtaining from the recipient mobile device a first registration in response to the first notification; and updating the curfew event of the security profile if the first registration is approved by a parole administrator.

19. The computer program product of claim 17, wherein the first curfew event requires the recipient mobile device to register a curfew location for future curfew events, and wherein the first registration includes a registration input for registering the first curfew event and the curfew location.

20. The computer program product of claim 17, wherein the operations further comprise:

furnishing an agenda to the mobile recipient device, the agenda including an agenda check-in location for the parolee to be present at an event at a predetermined agenda check-in time; and receiving an agenda check-in confirmation from the mobile device for the event.

* * * * *